US012345420B2

(12) United States Patent
Lee et al.

(10) Patent No.: US 12,345,420 B2
(45) Date of Patent: Jul. 1, 2025

(54) DOOR HINGE FOR OVEN

(71) Applicant: SEO WON KOREA CO., LTD., Gimhae-si (KR)

(72) Inventors: June Young Lee, Busan (KR); Kyoung Rok Kim, Busan (KR)

(73) Assignee: SEO WON KOREA CO., LTD. (KR)

( * ) Notice: Subject to any disclaimer, the term of this patent is extended or adjusted under 35 U.S.C. 154(b) by 513 days.

(21) Appl. No.: 17/863,658

(22) Filed: Jul. 13, 2022

(65) Prior Publication Data

US 2022/0349586 A1 Nov. 3, 2022

Related U.S. Application Data

(63) Continuation of application No. PCT/KR2020/018015, filed on Dec. 10, 2020.

(30) Foreign Application Priority Data

Oct. 16, 2020 (KR) ........................ 10-2020-0134096

(51) Int. Cl.
*F24C 15/02* (2006.01)
*E05D 11/06* (2006.01)
*E05D 11/08* (2006.01)

(52) U.S. Cl.
CPC ............ *F24C 15/023* (2013.01); *E05D 11/06* (2013.01); *E05D 11/087* (2013.01); *E05Y 2201/474* (2013.01); *E05Y 2201/638* (2013.01); *E05Y 2900/308* (2013.01)

(58) Field of Classification Search
CPC ...... F24C 15/023; E05D 11/06; E05D 11/087; E05F 1/1223; E05F 1/061; E05F 1/063; E05F 3/20
USPC ........................................... 126/19 R; 16/303
See application file for complete search history.

(56) References Cited

U.S. PATENT DOCUMENTS

| | | | | |
|---|---|---|---|---|
| 2015/0345203 A1* | 12/2015 | Vanini | ........................ | E05F 3/20 16/68 |
| 2019/0353353 A1* | 11/2019 | White | ................... | F24C 15/023 |

FOREIGN PATENT DOCUMENTS

| | | | |
|---|---|---|---|
| CN | 104350227 | A | 2/2015 |
| KR | 1020080082848 | A | 9/2008 |
| KR | 1020120019787 | A | 3/2012 |
| KR | 1020120020213 | A | 3/2012 |
| KR | 1020120020717 | A | 3/2012 |
| KR | 101383868 | B1 | 4/2014 |
| KR | 1020180034037 | A | 4/2018 |
| WO | 2019172592 | A1 | 9/2019 |

OTHER PUBLICATIONS

Korean Office Action (KR 10-2020-0134096), KIPO, Aug. 9, 2021.
International Search Report (PCT/KR2020/018015), WIPO, Sep. 1, 2021.
Korean Notice of Allowance (KR 10-2020-0134096), KIPO, Feb. 15, 2022.
Chinese Office Action (CN 202080094804.6), CNIPA, Feb. 9, 2025.

* cited by examiner

*Primary Examiner* — Vivek K Shirsat
(74) *Attorney, Agent, or Firm* — Park & Associates IP Law Office

(57) ABSTRACT

Proposed is a door hinge for an oven. More particularly, proposed is a door hinge for an oven, which when a door is opened, can prevent the door from being excessively opened and can prevent the door from being further opened at the maximum opening angle.

4 Claims, 10 Drawing Sheets

DOOR HINGE FOR OVEN

REFERENCE TO RELATED APPLICATIONS

This is a continuation of International Patent Application PCT/KR2020/018015 filed on Dec. 10, 2020, which designates the United States and claims priority of Korean Patent Application No. 10-2020-0134096 filed on Oct. 16, 2020, the entire contents of which are incorporated herein by reference.

FIELD OF THE INVENTION

The present disclosure relates generally to a door hinge for an oven. More particularly, the present disclosure to a door hinge for an oven, which when a door is opened, can prevent the door from being excessively opened and can prevent the door from being further opened at the maximum opening angle.

BACKGROUND OF THE INVENTION

In general, an oven (or an oven range) is a device in which food to be cooked is put inside a cooking space thereof and then heated and cooked after a door thereof is closed.

Such an oven is configured so that the cooking space is opened and closed while the door is rotated by a hinge device which connects a main body forming the cooking space to the door. In addition, the hinge device is configured so that the door is more safely and slowly opened to ensure user safety from heat generated when the food is cooked using the oven, and is also smoothly closed.

In Korean Patent Publication No. 10-2012-0020213, there is disclosed a hinge device for an oven, in which a damper means is connected to a hinge shaft of a door member of the hinge device to apply resistance when a door is closed, so that the door is slowly closed.

However, in the hinge device having such a configuration, the damper means has a very complicated structure, so there is a problem in that manufacturing cost is increased and productivity is lowered. Also, there is another problem in that, when the hinge device is mounted at a main body, a mounting space is restricted by the damper means which protrudes in a lateral direction of the hinge device.

In Korean Patent Publication No. 10-2012-0019787, there is disclosed a door hinge device for an oven, in which a roller which is moved relative to a door member when the door member is rotated is installed at a guide member inside a housing of the hinge device, and a damper member which enables a door to be slowly closed by hydraulic resistance when the door member is rotated is provided at an end of the guide member.

However, in the hinge apparatus having such a configuration, all of the roller, the guide member, and the damper member have to be accommodated in the housing, so there is a problem in that an internal structure of the housing becomes complicated, and manufacturing cost is increased.

Meanwhile, due to the structure of a conventional hinge, when the door is opened, there may occur a situation in which the door is opened excessively and suddenly. In this case, not only a loud noise is generated, but there is also a possibility that the door is easily damaged. In addition, a problem such as a user being injured by sudden exposure to heat may occur.

SUMMARY OF THE INVENTION

Accordingly, the present disclosure has been made keeping in mind the above problems occurring in the related art, and an objective of the present disclosure is to provide a door hinge for an oven, which can slowly open a door when it is opened, thereby preventing a user from being suddenly exposed to heat.

Another objective of the present disclosure is to provide a door hinge for an oven, which can easily induce opening and closing operations of a door.

Another objective of the present disclosure is to provide a door hinge for an oven, which can prevent a door from being further opened after the door is opened at a predetermined angle.

Other objectives and advantages of the present disclosure will be described below, and these will be included in a wider range of the present disclosure by not only the matters described in the claims of the present disclosure and the exemplary embodiment described below, but also means and combinations within the range that can be easily derived therefrom.

In order to accomplish the above objective, the present disclosure provides a door hinge for an oven, the door hinge including: a receptacle assembly installed in a body of the oven provided with a door; a casing installed at the door and connected to the receptacle assembly through a bar; a main cam connected to the receptacle assembly, and comprising a main body exposed to outside of the casing and a plurality of main wings connected to the main body inside the casing and provided in a tornado shape; a guide cam provided inside the casing, and comprising a plurality of guide wings provided in contact with the main wings of the main cam and a guide body provided with a plurality of protrusions along an outer wall thereof and connected to the guide wings; and an elastic member provided inside the casing and provided in contact with the guide cam, wherein a plurality of grooves configured to allow the protrusions of the guide cam to be linearly movable therein may be formed inside the casing at portions in contact with the protrusions, and when the door is opened, the receptacle assembly, the bar, and the main cam may be fixed, the casing and the guide cam may be rotated, and the elastic member may be contracted.

Furthermore, according a preferred embodiment of the present disclosure, two main wings and two guide wings may be provided, each of the main wings and the guide wings may have a curved portion and a straight portion, the curved portion of the main wing and the curved portion of the guide wing may be in contact with each other, and the straight portion of the main wing and the straight portion of the guide wing may be in contact with each other.

Furthermore, according a preferred embodiment of the present disclosure, during the opening of the door, the movement of the protrusions within the grooves may be stopped when an opening angle of the door reaches 98 degrees.

Furthermore, according a preferred embodiment of the present disclosure, during the opening of the door, as the curved portion of each of the guide wings is moved on the curved portion of each of the main wings by the rotation of the casing and the guide cam, the protrusions may be moved linearly into the grooves of the casing, so that the guide cam may be linearly moved, causing the elastic member to be contracted.

As described above, the present disclosure has the following effects.

When the door is opened and the maximum opening angle of the door reaches, for example, 98 degrees, the door is restricted from being further opened. Thus, when the door is opened, it is possible to solve the problem of excessive opening of the door, and to enable the door to be opened slowly to thereby prevent a user from being suddenly exposed to heat.

Also, it is possible to easily induce opening and closing operations of the door.

Other effects of the present disclosure will be included in a wider range of the present disclosure by not only the exemplary embodiment described above and the matters described in the claims of the present disclosure, but also effects within the range that can be easily derived therefrom and the possibilities of potential advantages contributing to industrial development.

DETAILED DESCRIPTION OF THE INVENTION

Reference will now be made in greater detail to an exemplary embodiment of the disclosure with reference to the accompanying drawings. Advantages and characteristics of the present disclosure, and a method of achieving the advantages and characteristics will be clear with reference to embodiments described in detail below together with the accompanying drawings. The terminology used herein is for the purpose of describing particular embodiments only and is not intended to be limiting. As used herein, the singular forms are intended to include the plural forms as well, unless the context clearly indicates otherwise. It will also be understood that words indicating directions are used to help the understanding of the description and may be changed according to a point of view.

Figure 1:
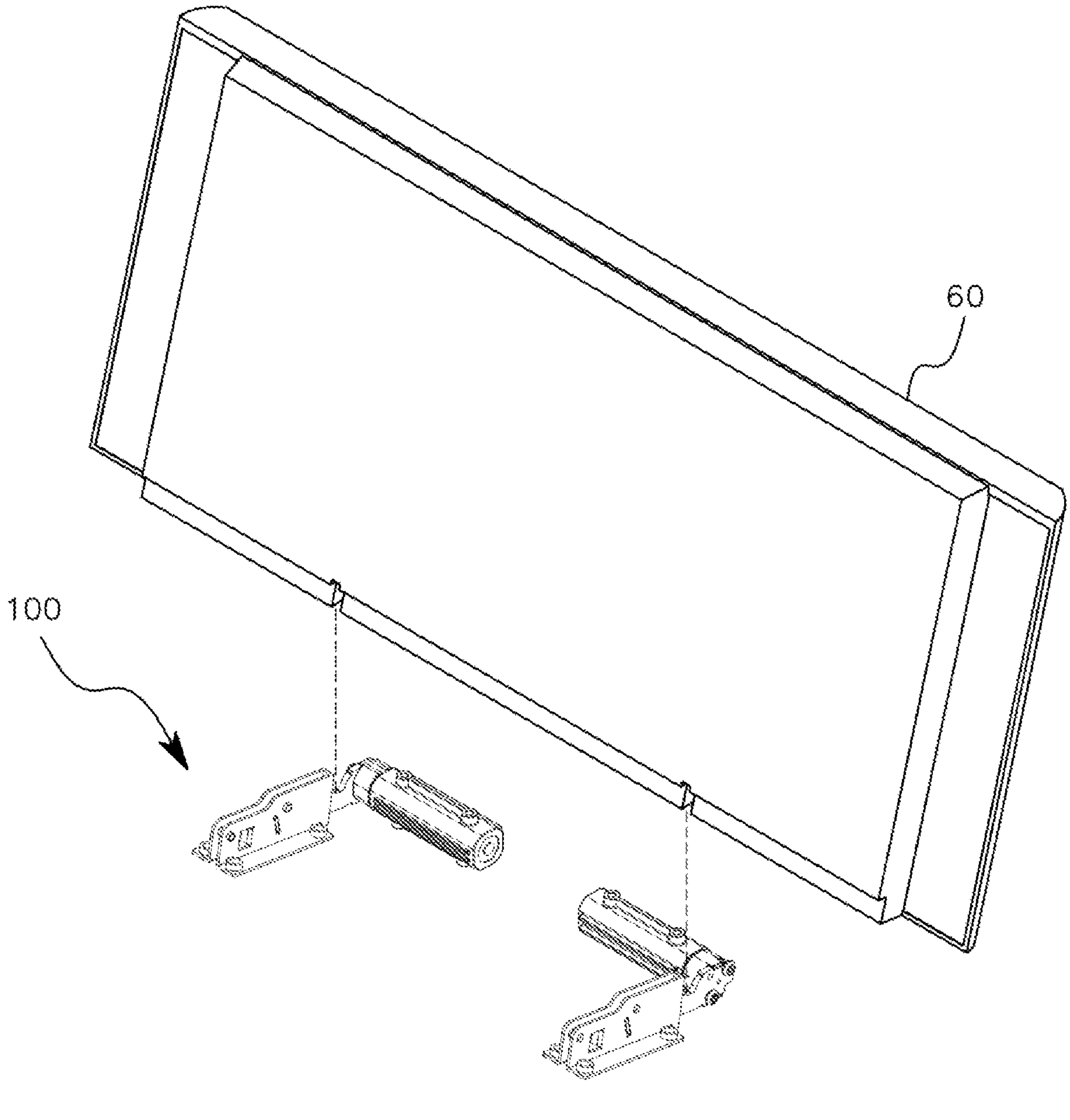
FIG. 1 is a view illustrating a state in which the door hinge for the oven according to the present disclosure is mounted to a door.

Hereinafter, a door hinge for an oven according to an exemplary embodiment of the present disclosure will be described in detail with reference to the accompanying drawings. FIG. 1 is a view illustrating a state in which the door hinge for the oven according to the present disclosure is mounted to a door.

Referring to FIG. 1, the door hinge 100 for the oven according to the present disclosure is installed at the door 60 of the oven. The door hinge 100 for the oven according to the present disclosure may be symmetrically provided at each of left and right sides of the door 60. A receptacle assembly (refer to the reference numeral 50 in FIGS. 2 and 3) of the door hinge 100 for the oven is fixed to an oven body (not illustrated), and other parts are fixed to the door 60.

In the drawings, it is exemplarily illustrated that two door hinges 100 are installed at the door 60, but the present disclosure is not limited thereto.

Figure 2A:
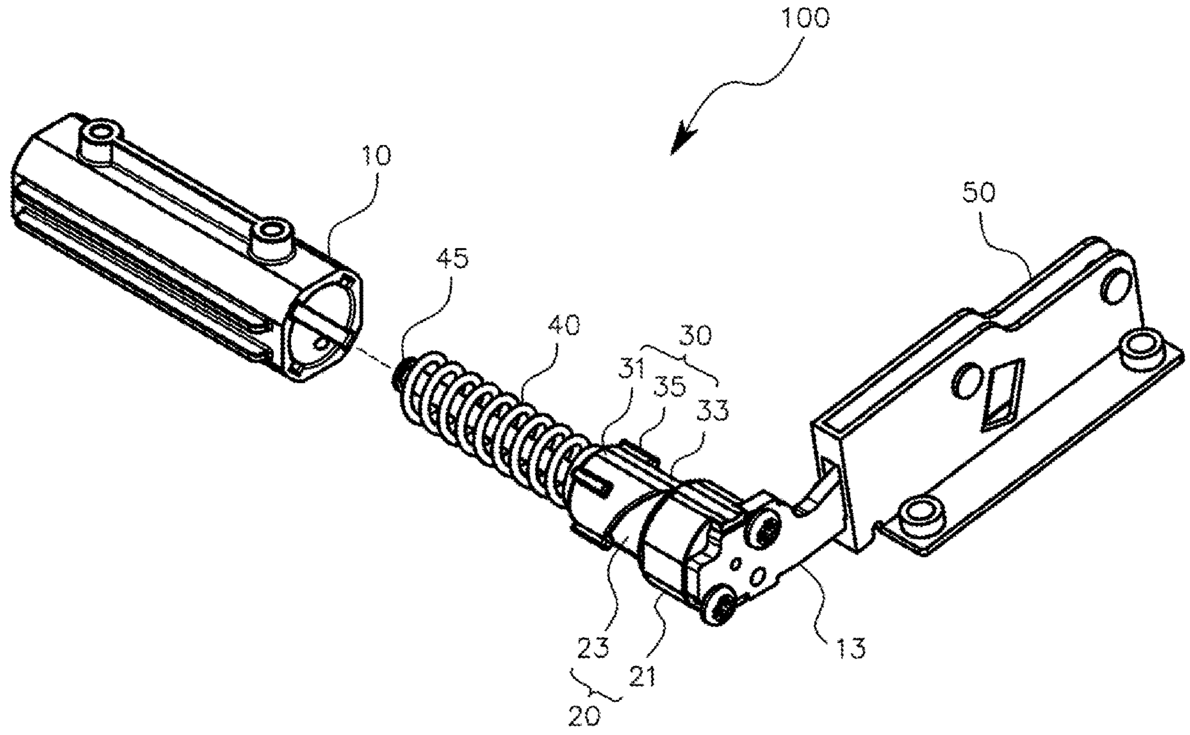
FIGS. 2A and 2B are perspective views illustrating the door hinge for the oven according to the present disclosure when the door is in a closed state.
Figure 2B:
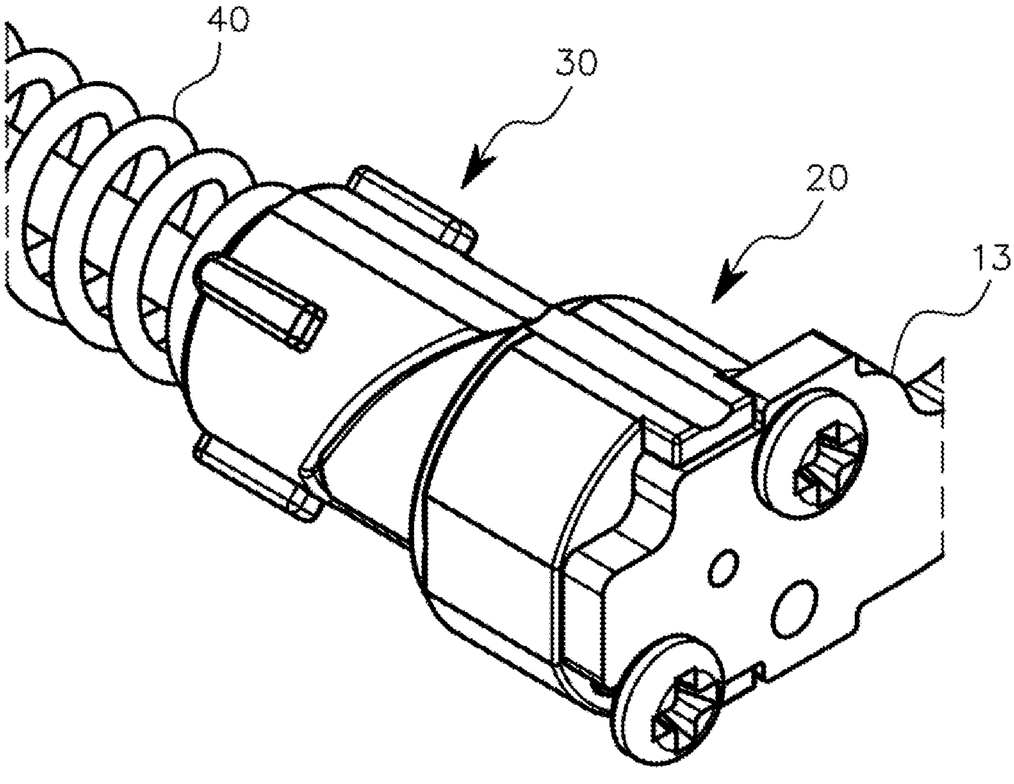

Next, the door hinge 100 for the oven according to the present disclosure will be described in more detail. FIGS. 2A and 2B are perspective views illustrating the door hinge for the oven according to the present disclosure when the door is in a closed state.

First, referring to FIG. 2A, the door hinge 100 for the oven according to the present disclosure includes a casing 10, a main cam 20, a guide cam 30, an elastic member 40, and the receptacle assembly 50.

As described above, the receptacle assembly 50 is fixedly installed at the oven body. The receptacle assembly 50 is connected to the casing 10 and other parts through a bar 13 which will be described below. The receptacle assembly 50 and the bar 13 are fixedly installed so as not to be moved even when the door 60 is opened.

The casing 10 is installed at the door 60 of the oven. The casing 10 is connected to the receptacle assembly 50 through the bar 13. When the door 60 is opened, the casing 10 is rotated in conjunction with the movement of the door 60.

Figure 5A:
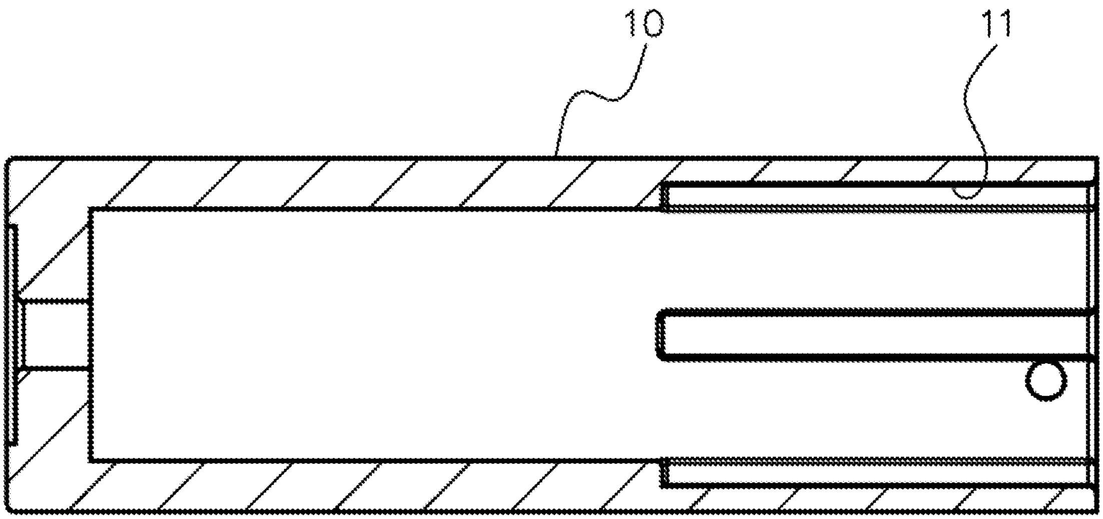
FIGS. 5A to 5C are views illustrating the inside of a casing in the door hinge for the oven according to the present disclosure and the movement of the guide cam inside the casing.

The casing 10 has a groove 11 formed therein. An internal view of the casing 10 is illustrated in FIG. 5A. Referring to FIG. 5A, a plurality of, for example, four grooves 11 are formed in the casing 10. The grooves 11 of the casing 10 are portions which are in contact with a protrusion 35 of the guide cam 30 which will be described later. The grooves 11 are provided to allow the protrusion 35 to be linearly movable therein. In particular, the grooves 11 restrict the movement of the protrusion 35 so as not to be further moved after the protrusion 35 is linearly moved to a certain extent. In this case, the state in which the protrusion 35 is restricted from being further moved corresponds to a state in which a maximum opening angle of the door 60 reaches a predetermined angle, for example, 98 degrees. The protrusion 35 is interfered with by the grooves 11 so as not to be further moved linearly, so that the door 60 is restricted from being opened by an angle of equal to or greater than 98 degrees.

The main cam 20, the guide cam 30, the elastic member 40, and the like are provided inside the casing 10.

Figure 4:
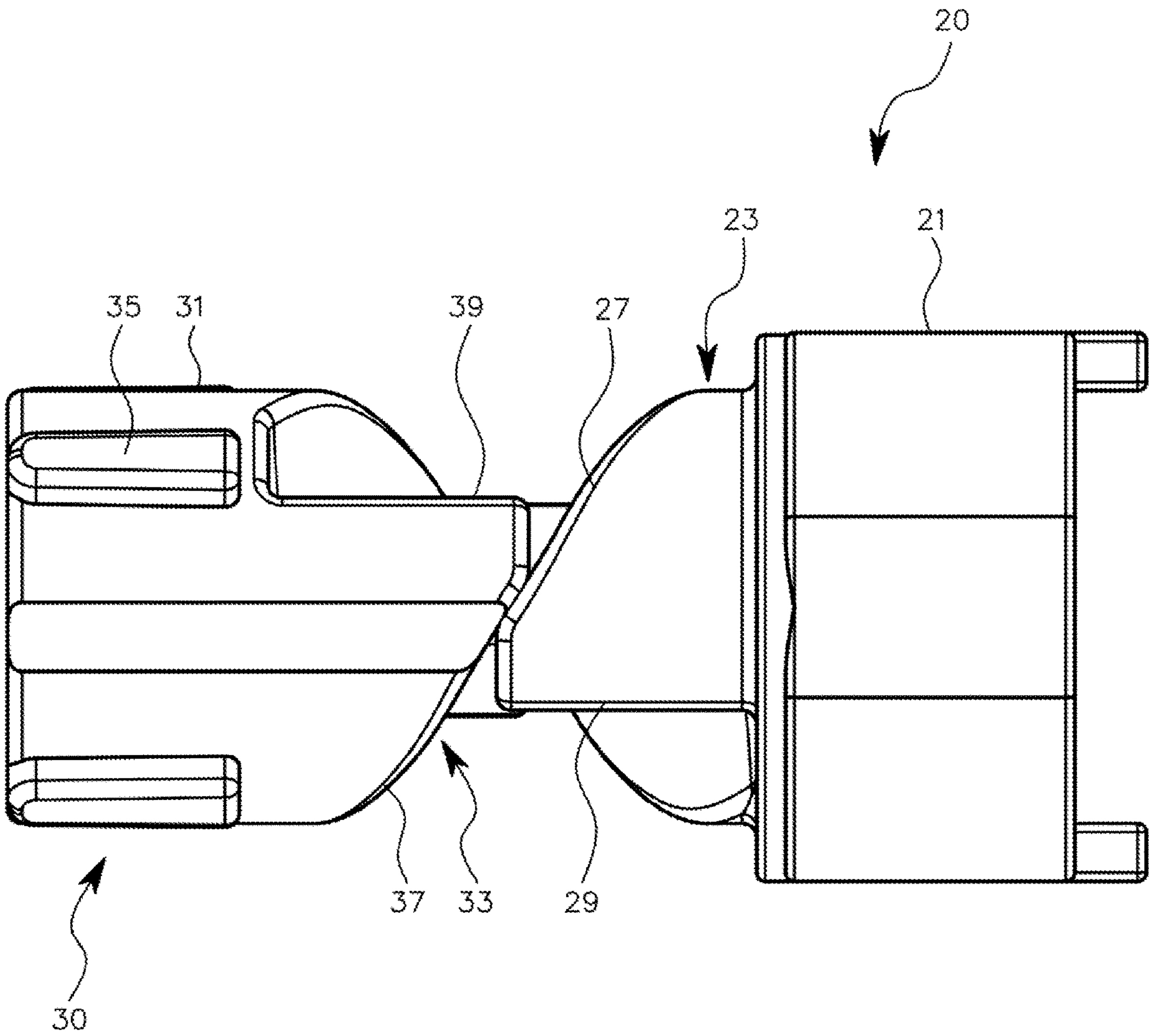
FIG. 4 is a perspective view illustrating a main cam and a guide cam of the door hinge for the oven according to the present disclosure.

The main cam 20 includes a main body 21 and a main wing 23. The main body 21 of the main cam 20 is a portion which is connected to the bar 13 and is exposed to the outside of the casing 10. The main body 21 may have a cylindrical shape. The main cam 20 and the guide cam 30 are illustrated in more detail in FIG. 4. FIG. 4 is a perspective view illustrating the main cam and the guide cam of the door hinge for the oven according to the present disclosure.

Referring to FIG. 4, the main wing 23 of the main cam 20 is connected to the main body 21 and is provided inside the casing 10. Two main wings 23 may be provided in a tornado shape, and in detail, each of which includes a curved portion 27 and a straight portion 29. The curved portion 27 of the main wing 23 is provided in a tornado shape with curves, and the straight portion 29 is provided in a straight shape extending from the main body 21 toward the casing 10. The curved portion 27 and the straight portion 29 of the main wing 23 correspond to a curved portion 37 and a straight portion 39 of a guide wing 31 which will be described below.

The curved portion 27 of the main wing 23 is in contact with the curved portion 37 of the guide wing 31, and the straight portion 29 of the main wing 23 is in contact with the straight portion 39 of the guide wing 31. When the door 60 is opened, the guide cam 30 is moved on the main cam 20 by the respective curved portions 27 and 37 which are in contact with each other. When the guide cam 30 is moved on the main cam 20, the guide cam 30 is interfered with by the main cam 20 so as not to be further moved after being moved to a certain extent. In other words, the movement of the guide cam 30 is stopped due to the interference with the main cam 20 at a point where the opening angle of the door 60 reaches a predetermined angle, for example, 98 degrees.

The guide cam 30 is provided inside the casing 10. The guide cam 30 is provided in contact with the main cam 20 inside the casing 10. Referring to FIG. 4, the guide cam 30 includes a guide body 31, a guide wing 33, and a protrusion 35. The guide wing 33 of the guide cam 30 is in contact with the main wing 23 of the main cam 20.

As in the case of the main cam 23, two guide wings 33 may be provided in a tornado shape and each of which includes the curved portion 37 and the straight portion 39. The curved portion 37 of the guide wing 33 is provided in a tornado shape with curves, and the straight portion 39 is provided in a straight shape extending from the guide body 31 toward the main cam 20. The curved portion 37 of the guide wing 33 is in contact with the curved portion 37 of the main wing 23, and the straight portion 39 of the guide wing 33 is in contact with the straight portion 29 of the main wing 23.

A plurality of protrusions 35 are provided along an outer wall of the guide body 31. The protrusions 35 are provided on the guide body 31 in the same direction as the straight portion 39, and for example, four protrusions 35 may be provided. The protrusions 35 are portions in contact with the grooves 11 of the casing 10. The protrusions 35 are linearly movable within the grooves 11. The protrusions 35 are linearly moved only a predetermined distance within the grooves 11, so that the door 60 is restricted from being further opened in the oven, and the maximum opening angle of the door 60 can be properly maintained.

The elastic member 40 is provided inside the casing 10. The elastic member 40 is fitted over a rod 45. The rod 45 passes through the centers of the guide cam 30 and the main cam 20, with a first side thereof being connected to the bar 13. A second side of the rod 45 is connected to the casing 10, and the rod 45 is fixedly installed without being rotated.

The elastic member 40 is provided in contact with the guide cam 30. When the door 60 is opened, the elastic member 40 is contracted by the guide cam 30 which is rotated and moved linearly on the main cam 20.

Figure 3A:
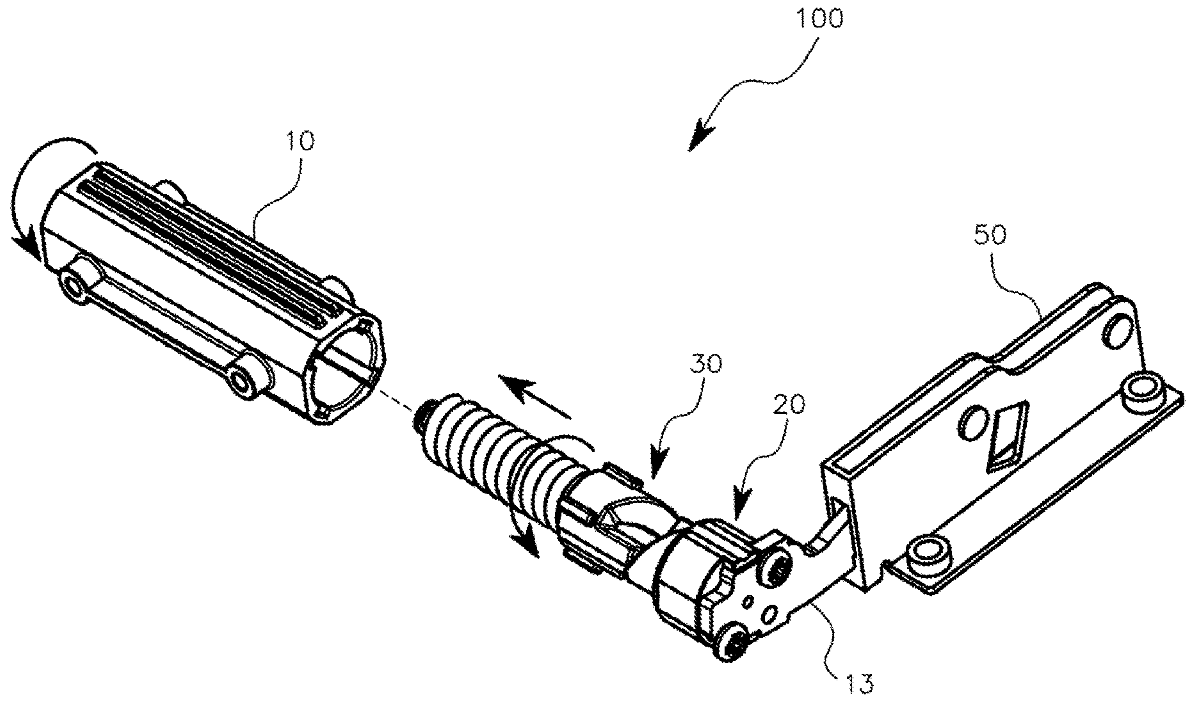
FIGS. 3A to 3C are perspective views illustrating the door hinge for the oven according to the present disclosure when the door is in an opened state.
Figure 3B:
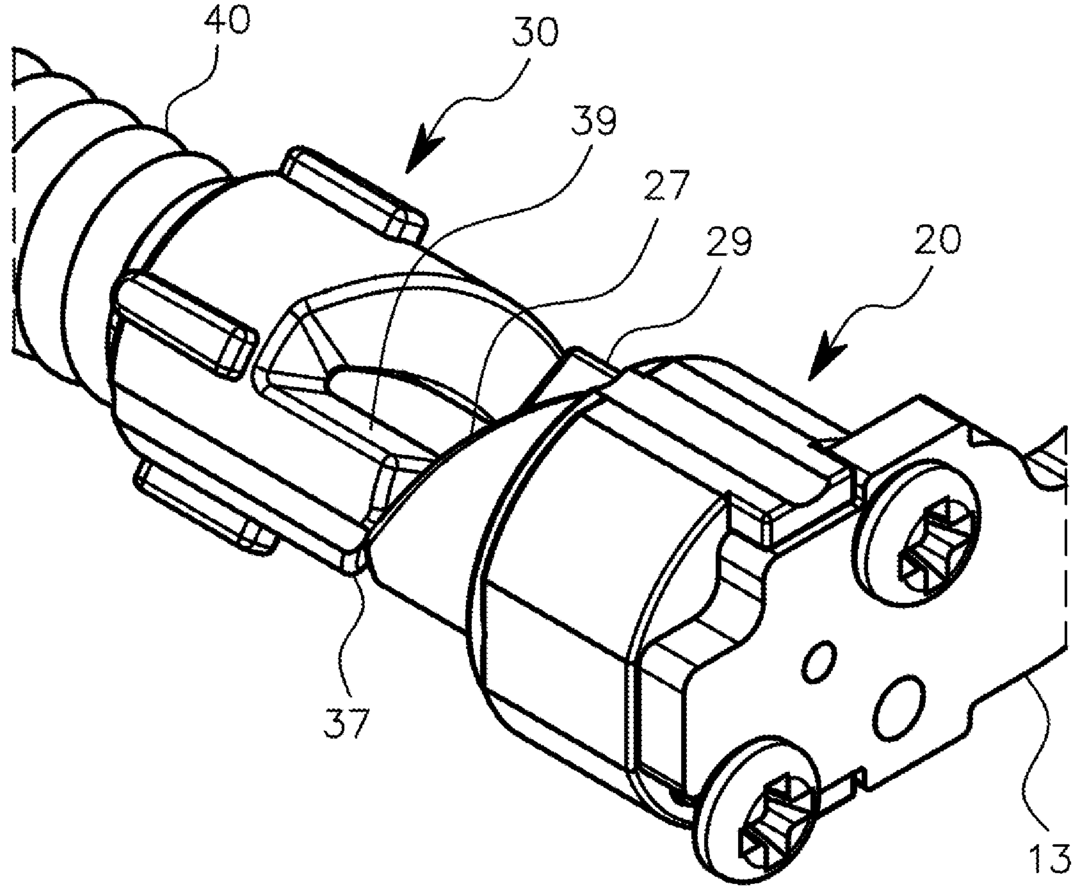
Figure 3C:
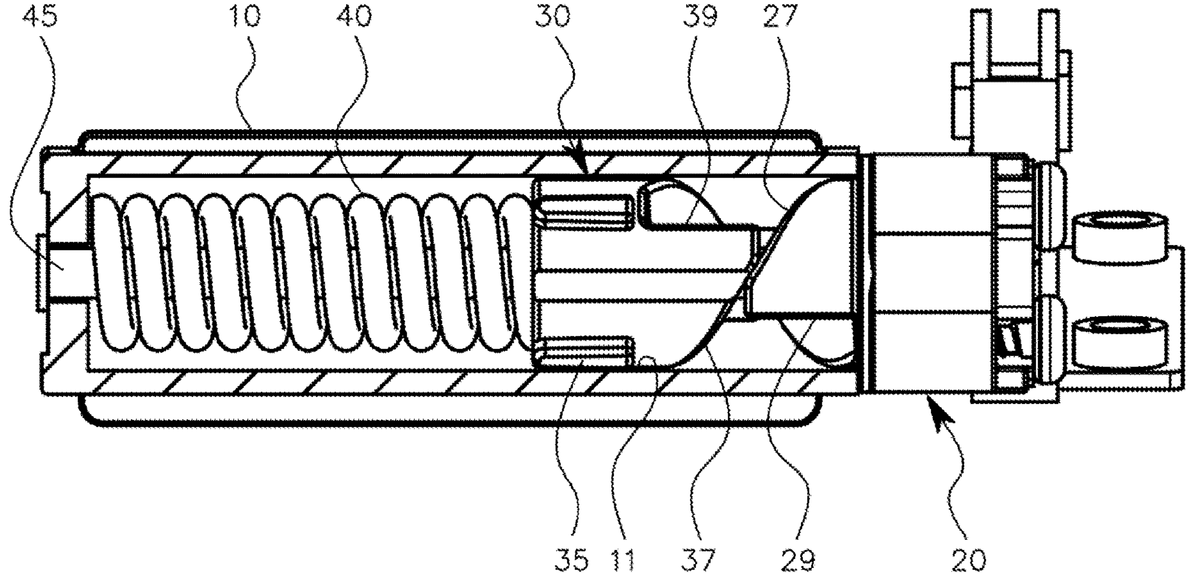
Figure 5B:
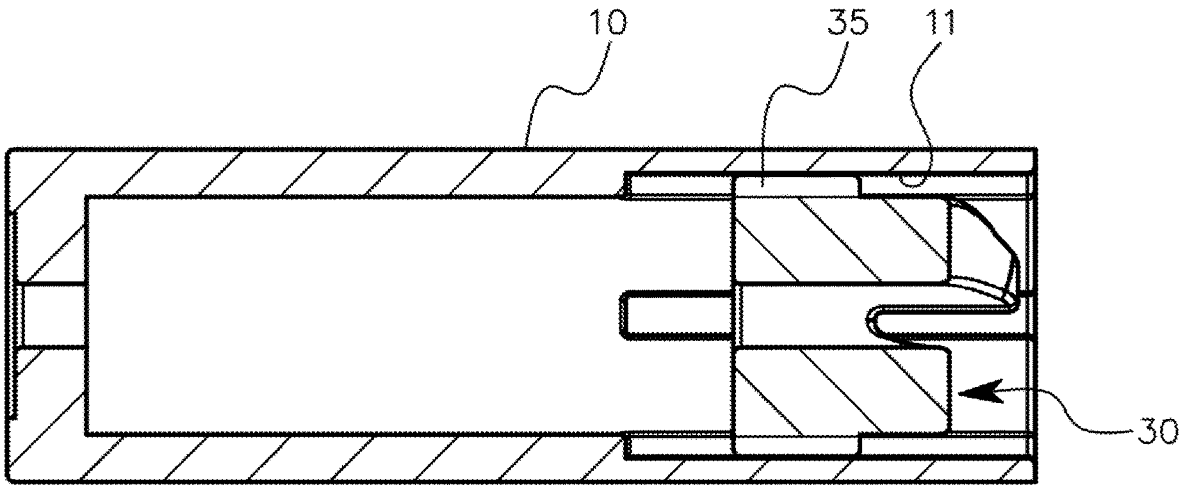
Figure 5C:
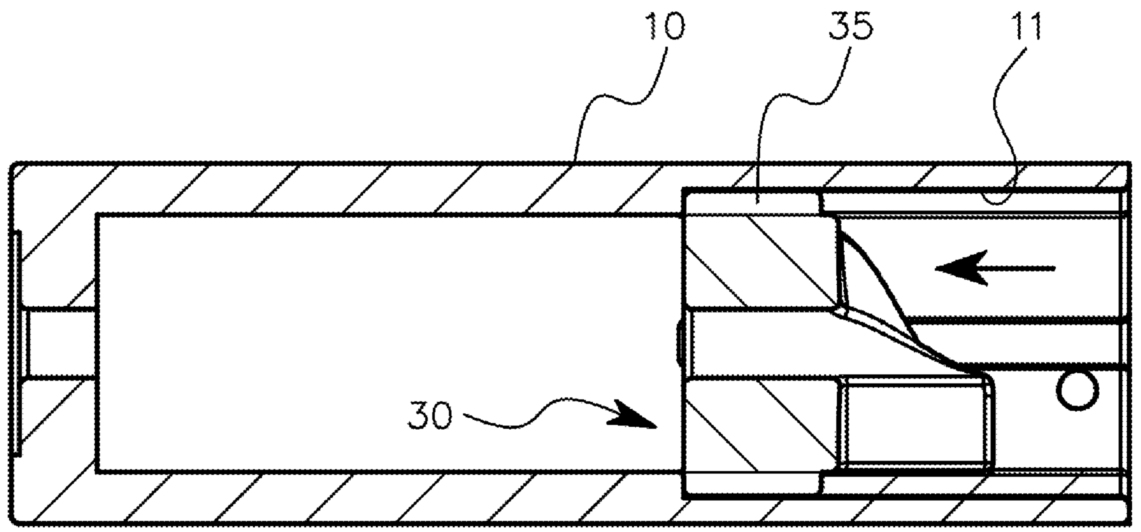

Hereinafter, the operation of the door hinge 100 for the oven according to the present embodiment during the rotation of the door 60 will be described in detail. FIGS. 2A and 2B are perspective views illustrating the door hinge for the oven according to the present disclosure when the door is in an opened state. FIGS. 3A to 3C are perspective views illustrating the door hinge for the oven according to the present disclosure when the door is in a closed state. FIGS. 5A to 5C are views illustrating the inside of the casing in the door hinge for the oven according to the present disclosure and the movement of the guide cam inside the casing.

First, referring to FIGS. 2A and 2B, when the door 60 is in a closed state, the curved portion 27 of each of the main wings 23 of the main cam 20 and the curved portion 27 of each of the guide wing 33 of the guide cam 30 are in a complete contact state. The straight portion 29 of each of the main wings 23 of the main cam 20 and the straight portion 39 of each of the guide wings 33 of the guide cam 30 are also in a complete contact state. The elastic member 40 is in a tensioned state. Inside the casing 10, the guide cam 30 is provided in a state as illustrated in FIG. 5B.

Next, when the door 60 is opened as illustrated in FIGS. 3A and 3B, the receptacle assembly 50, the bar 13, and the main cam 20 are fixed without being rotated, while the casing 10 and the guide cam 30 are rotated. In other words, the casing 10 connected to the door 60 is rotated by the opening of the door 60, and as illustrated in FIG. 5C, the protrusions 35 of the guide cam 30 are moved along the grooves 11 of the casing 10 by the rotation of the casing 10. At this time, the guide wings 33 of the guide cam 30 are rotated and moved on the main wings 23 of the main cam 20.

Here, the linear movement of the protrusions 35 of the guide cam 30 is interfered with by the grooves 11 of the casing 10, and the movement of the guide wings 33 of the guide cam 30 is interfered with by the main wings 23 of the main cam 20, so that the opening angle of the door 60 can be maintained at 98 degrees.

Although the exemplary embodiment of the present disclosure has been disclosed for illustrative purposes, those skilled in the art will appreciate that various modifications, additions, and substitutions are possible, without departing from the essential features of the disclosure. As described above, the embodiment disclosed herein and the accompanying drawings are for the purpose of describing particular embodiments only and are not intended to limit the technical spirit of the disclosure. Therefore, the scope of the disclosure should be determined on the basis of the descriptions in the appended claims, and all equivalents thereof should belong to the scope of the disclosure.

What is claimed is:

1. A door hinge for an appliance, the door hinge comprising:

a receptacle assembly installed in a body of the appliance coupled with a door;

a casing installed at the door and connected to the receptacle assembly through a bar extended from the receptacle assembly;

a main cam connected to the bar and comprising a main body exposed to outside of the casing, and a plurality of main wings disposed at a distal end of the main body inside the casing and having a tornado or swirl shape;

a guide cam provided inside the casing, and comprising a guide body provided with a plurality of protrusions along an outer wall thereof, and a plurality of guide wings disposed at a proximal end of the guide body, wherein the guide wings are adapted to couple to the main wings of the main cam; and an elastic member provided inside the casing in contact with a distal end of the guide body of the guide cam, wherein a plurality of grooves are formed inside the casing at locations corresponding to the protrusions, the grooves being configured to allow the protrusions of the guide cam to be linearly movable therein, and when the door is opened, the receptacle assembly, the bar, and the main cam are fixed, the casing and the guide cam are configured to be rotated, while the elastic member is contracted.

2. The door hinge of claim 1, wherein two main wings and two guide wings are provided, each of the main wings and the guide wings has a curved portion and a straight portion, the curved portion of the main wing and the curved portion of the guide wing are configured to be in contact with each other, and the straight portion of the main wing and the straight portion of the guide wing are configured to be in contact with each other.

3. The door hinge of claim 1, wherein during the opening of the door, the movement of the protrusions within the grooves is stopped when an opening angle of the door reaches a preset degree.

4. The door hinge of claim 2, wherein during the opening of the door, as the curved portion of each of the guide wings is moved on the curved portion of each of the main wings by the rotation of the casing and the guide cam, the protrusions are moved linearly into the grooves of the casing, so that the guide cam is linearly moved, causing the elastic member to be contracted.

* * * * *